(12) United States Patent
Ito

(10) Patent No.: US 8,947,699 B2
(45) Date of Patent: Feb. 3, 2015

(54) IMAGE PROCESSING APPARATUS AND CONTROL METHOD THEREOF

(75) Inventor: Fumitoshi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 12/999,857

(22) PCT Filed: Oct. 20, 2010

(86) PCT No.: PCT/JP2010/069016
§ 371 (c)(1),
(2), (4) Date: Dec. 17, 2010

(87) PCT Pub. No.: WO2011/067999
PCT Pub. Date: Jun. 9, 2011

(65) Prior Publication Data
US 2011/0235103 A1    Sep. 29, 2011

(30) Foreign Application Priority Data

Dec. 2, 2009    (JP) ................................ 2009-274932

(51) Int. Cl.
*G06K 15/00*    (2006.01)
*H04N 1/00*    (2006.01)

(52) U.S. Cl.
CPC ....... *H04N 1/00464* (2013.01); *H04N 1/00474* (2013.01); *H04N 1/0048* (2013.01); *H04N 1/00482* (2013.01); *H04N 1/00244* (2013.01); *H04N 1/00506* (2013.01); *H04N 1/0097* (2013.01); *H04N 1/00973* (2013.01); *H04N 2201/3276* (2013.01)
USPC ........ 358/1.15; 358/1.14; 358/1.13; 709/224; 709/203

(58) Field of Classification Search
USPC ............ 358/1.15, 1.14, 1.16, 1.18, 1.13, 1.12
See application file for complete search history.

(56) References Cited

U.S. PATENT DOCUMENTS

| 7,301,681 B2* | 11/2007 | Tabata et al. ................... 358/514 |
| 7,317,549 B2* | 1/2008 | Naito ........................... 358/1.15 |
| 7,325,045 B1* | 1/2008 | Manber et al. ................. 709/219 |
| 7,603,189 B2* | 10/2009 | Tanaka et al. ................... 700/83 |
| 8,120,793 B2* | 2/2012 | Lovat et al. ................... 358/1.14 |
| 2003/0187978 A1 | 10/2003 | Nakamura et al. ............ 709/224 |
| 2006/0077423 A1* | 4/2006 | Mathieson et al. .......... 358/1.15 |
| 2006/0077428 A1* | 4/2006 | Lovat et al. ................... 358/1.15 |
| 2006/0077443 A1 | 4/2006 | Lum et al. .................... 358/1.15 |
| 2007/0283295 A1 | 12/2007 | Honma ......................... 715/847 |
| 2008/0059312 A1* | 3/2008 | Gern et al. ...................... 705/14 |
| 2009/0009803 A1* | 1/2009 | Takeuchi et al. ............. 358/1.15 |
| 2009/0150787 A1* | 6/2009 | Maehira et al. ............... 715/733 |
| 2009/0303532 A1 | 12/2009 | Ito ............................... 358/1.15 |
| 2011/0208809 A1 | 8/2011 | Ito ............................... 709/203 |

FOREIGN PATENT DOCUMENTS

| JP | 2003-099174 | 4/2003 |
| JP | 2003-288285 | 10/2003 |

(Continued)

*Primary Examiner* — Ashish K Thomas
(74) *Attorney, Agent, or Firm* — Fitzpatrick, Cella, Harper & Scinto

(57) ABSTRACT

When operation screen data sent from a Web server can be received, an image processing apparatus displays an operation screen based on the operation screen data on an operation unit. On the other hand, when operation screen data cannot be received due to a communication error, the image processing apparatus displays a substitute operation screen that allows it use of at least one of its image processing functions on the operation unit.

14 Claims, 9 Drawing Sheets

(56) References Cited

FOREIGN PATENT DOCUMENTS

| JP | 2005-176403 | 6/2005 |
| JP | 2006-127503 | 5/2006 |
| JP | 2007-87399 A | 4/2007 |
| JP | 2007-323366 | 12/2007 |

* cited by examiner

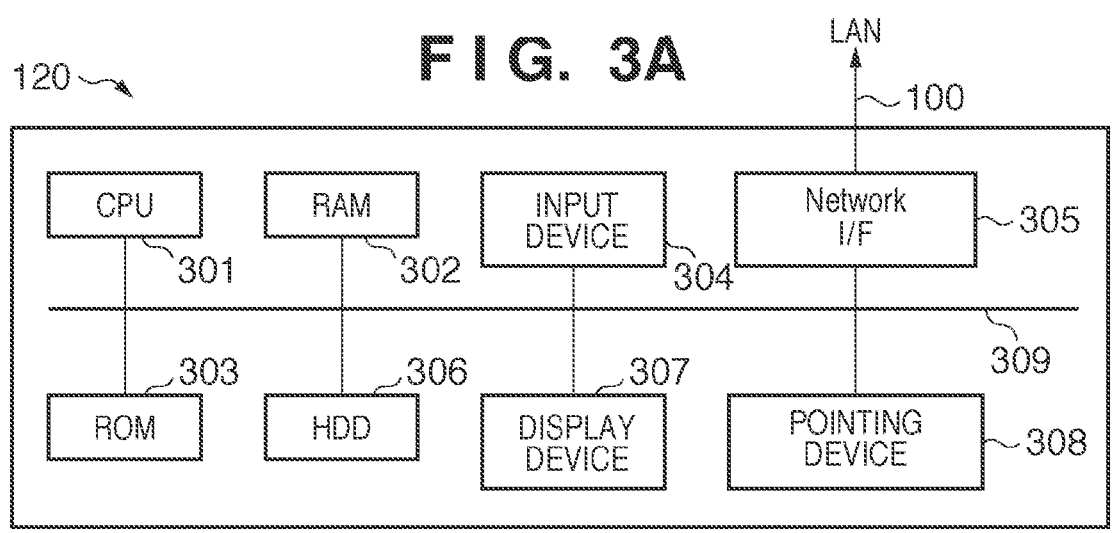
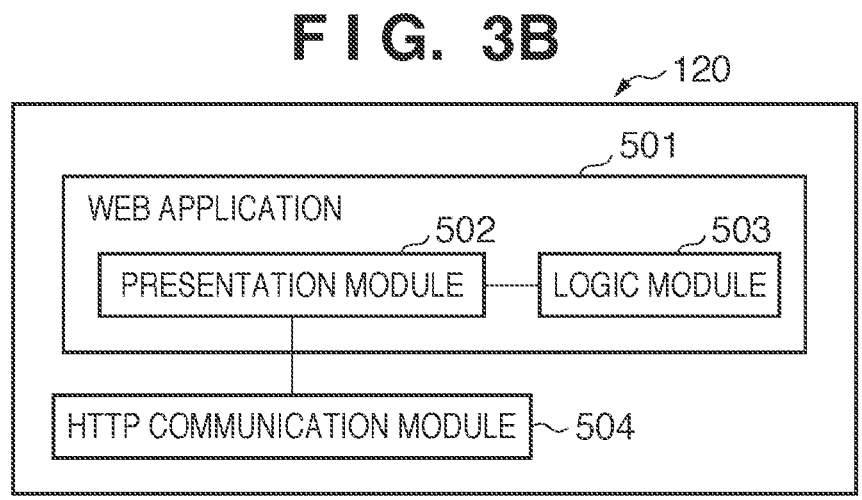
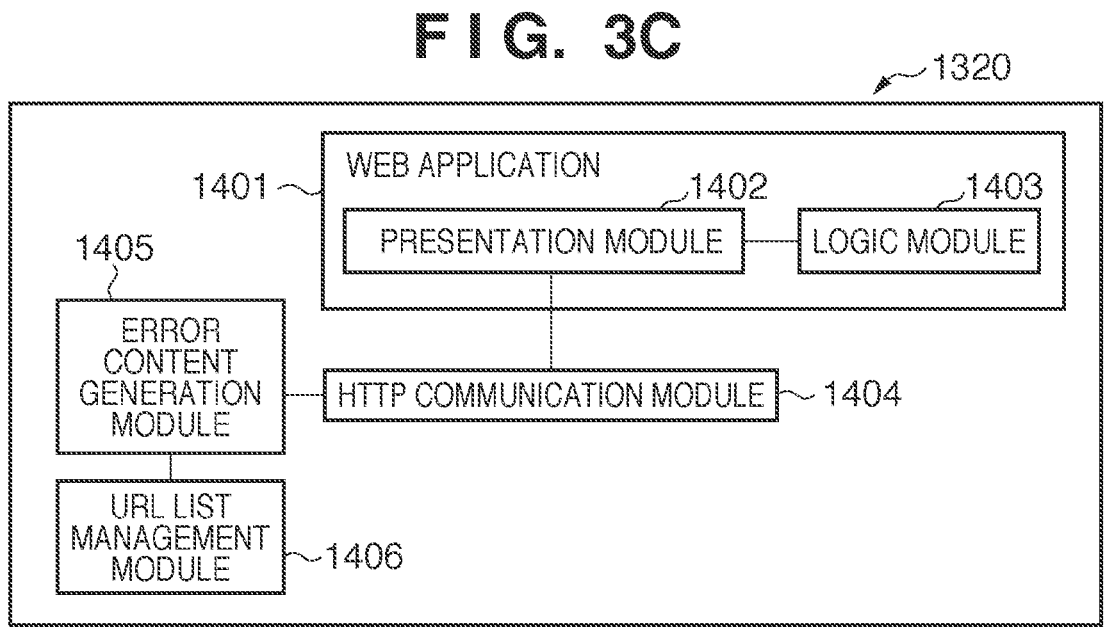

FIG. 4

| AVAILABLE FUNCTION (601) | WEB SITE (602) | AUTHENTI-CATION (603) | PERMISSION (604) |
|---|---|---|---|
| Menu | www.xxx.com/webapp1/menu/ | NOT REQUIRED | — |
| Copy | www.xxx.com/webapp1/copy/<br>www.yyy.com/webapp/ | NOT REQUIRED | — |
| Send | www.xxx.com/webapp1/send/<br>www.nnn.com/sendapp/ | REQUIRED | — |
| Setting | www.xxx.com/webapp2/ | REQUIRED | ADMINISTRATOR |
| ... | ... | ... | ... |

FIG. 5A

```
<!DOCTYPE HTML PUBLIC "-//W3C//DTD HTML 3.2 Final//EN">
<head>
<title>503 Server Unavailable</title>
</head>

<body>
<h1> Server Unavailable</h1>
</body>
</html>
```

FIG. 5B

```
<!DOCTYPE HTML PUBLIC "-//W3C//DTD HTML 3.2 Final//EN">
<head>
<title>503 Server Unavailable</title>
</head>

<body>
<h1> Server Unavailable</h1>
</button onclick ="showFunction('Menu', 'Everyone')">Show Device Menu</button>
</body>
</html>
```

1001    1002

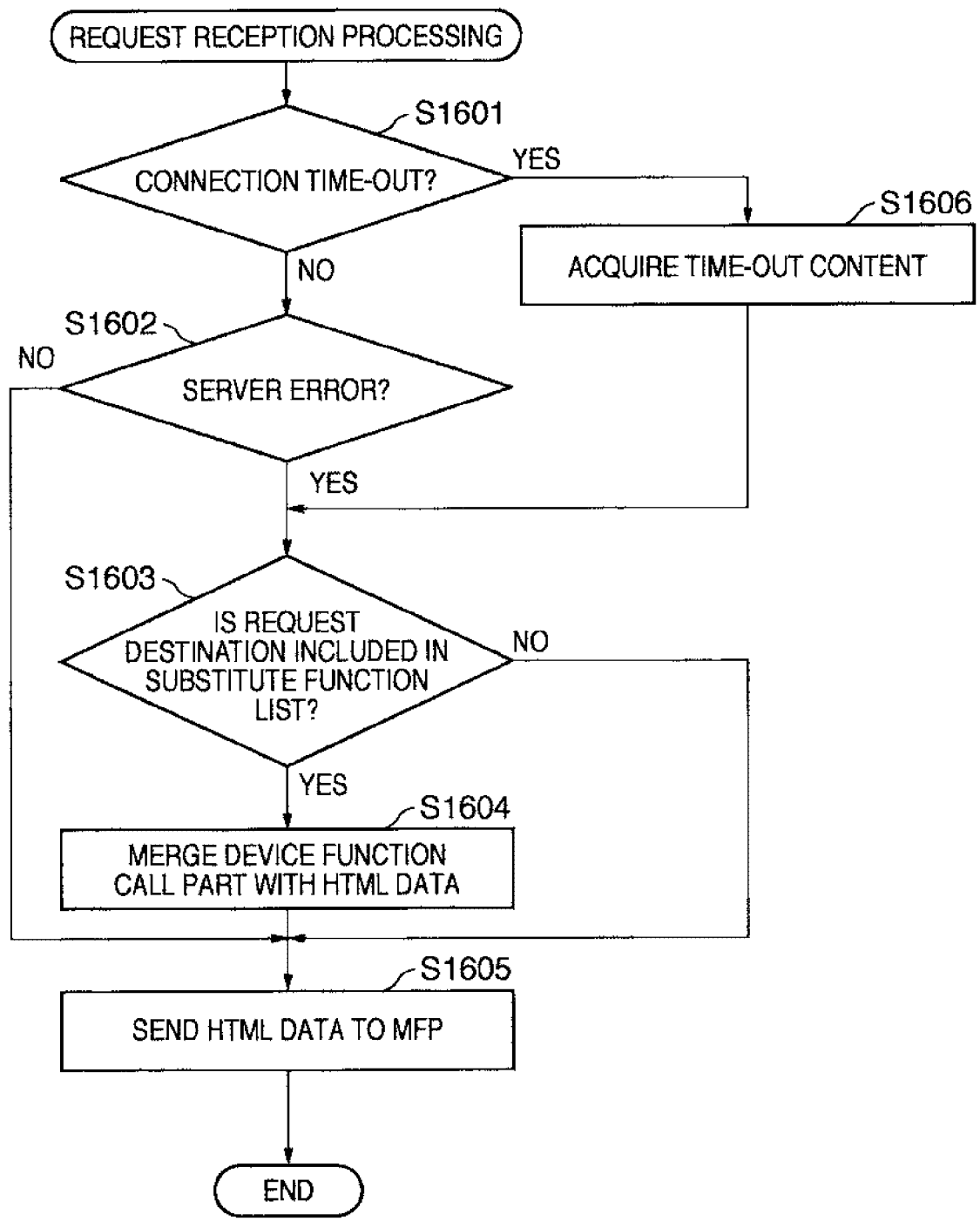

IMAGE PROCESSING APPARATUS AND CONTROL METHOD THEREOF

TECHNICAL FIELD

The present invention relates to an image processing apparatus and a control method thereof.

BACKGROUND ART

In recent years, even some peripheral devices such as MFPs (Multi Function Peripherals) including scanners and printers include a Web browser.

Japanese Patent Laid-Open No. 2006-127503 discloses a screen provided by a Web server being displayed on a Web browser of an MFP, and accepting various instructions from the user as an operation screen. According to Japanese Patent Laid-Open No. 2006-127503, the Web server provides the operation screen used to input instructions required to use respective functions included in the MFP. That is, the user of the MFP inputs an instruction to the MFP via the operation screen displayed on the Web browser. Then, the Web browser of the MFP notifies the Web server of the input instruction. The Web server which received the notification requests the MFP to execute various processes in accordance with the content of the instruction input from the user. Then, in response to this request, the MFP executes the requested processes. In this way, all menu data required to operate the MFP need not be held in the MFP, and the menu data need only be changed on the Web server.

On the other hand, as the relationship between an information processing apparatus and Web server, a plurality of information processing apparatuses are normally connected to a single Web server. For this reason, when the plurality of information processing apparatuses simultaneously make connection attempts, the load on the Web server becomes heavy. In such case, a service substitution method described in Japanese Patent Laid-Open No. 2003-288285 is available. According to Japanese Patent Laid-Open No. 2003-288285, the status of the Web server is monitored, and when it is determined that the Web server cannot process requests due to a heavy load, a substitute server accepts only requests. Then, when the Web server has recovered, the substitute server sends the requests to the Web server.

However, the system described in Japanese Patent Laid-Open No. 2006-127503 can be used not only to simply manage the menus but also to customize the screen. In consideration of such a system, all the operation screens of the MFP can be handled by screens displayed by the Web browser. In this case, however, the following problem is posed.

For example, when normal communication with the Web server is disrupted due to a network or Web server problem, a communication error screen is displayed on the Web browser of the MFP. However, a copy function basically included in the MFP is to be enabled even in an offline state disconnected from the Web server since it does not use a network.

According to Japanese Patent Laid-Open No. 2006-127503, when the MFP cannot establish a connection to the Web server, an error message is displayed. Alternatively, since the MFP retries a connection until it is established, such problem cannot be solved. On the other hand, according to Japanese Patent Laid-Open No. 2003-288285, when the MFP cannot establish a connection to the Web server, it cannot transfer any request even to the substitute server. Hence, Japanese Patent Laid-Open No. 2003-288285 cannot solve this problem, either.

SUMMARY OF INVENTION

The present invention solves the aforementioned problems. That is, the present invention provides a substitute function required to call a user interface included in an MFP, for example, when the MFP cannot normally communicate with a Web server.

An aspect of the present invention provides an image processing apparatus configured to execute at least one image processing function. The apparatus includes request means for requesting a Web server to send operation screen data, and display control means for receiving the operation screen data which is sent from the Web server in response to the request from the request means, and displaying an operation screen based on the operation screen data on an operation unit. When the display control means fails to receive the operation screen data, the display control means displays a substitute operation screen that allows to instruct use of the at least one image processing function on the operation unit.

Another aspect of the present invention provides a control method of an image processing apparatus configured to execute at least one image processing function. The method includes the steps of requesting a Web server to send operation screen data, and receiving the operation screen data which is sent from the Web server in response to the request, and displaying an operation screen based on the operation screen data on an operation unit. When the operation screen data is failed to receive, a substitute operation screen that allows to instruct use of the at least one image processing function is displayed on the operation unit.

Further features of the present invention will become apparent from the following description of exemplary embodiments (with reference to the attached drawings).

BRIEF DESCRIPTION OF DRAWINGS

FIGS. 3A to 3C are block diagrams showing examples of the arrangements of a Web server according to the embodiments;

FIG. 4 is a table of a substitute function list in the embodiment;

FIG. 5A is a view showing an example of HTML data in case of a server busy state, and FIG. 5B is a view showing an example of HTML data merged with a GUI button;

FIG. 9 is a flowchart of request reception processing to another server in the Web server according to the embodiment.

DESCRIPTION OF EMBODIMENTS

First Embodiment

An MFP according to the first embodiment will be described first. The MFP is an image processing apparatus which is configured to execute at least one image processing function. The first embodiment will explain an example in which the MFP as an example of the image processing apparatus of the present invention requests a Web server to send a UI menu of the image processing apparatus. In this example, an example of user interface (UI) display processing executed when a communication with the Web server is not normally made will be explained.

<System Arrangement>

Figure 1A:
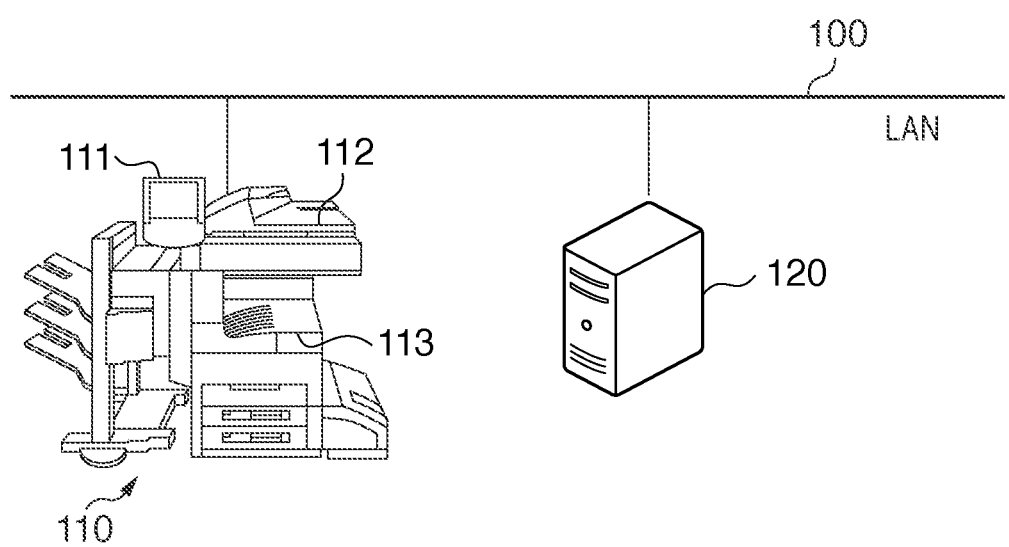
FIGS. 1A and 1B are diagrams showing examples of the overall arrangements of information processing systems according to embodiments.
Figure 1B:
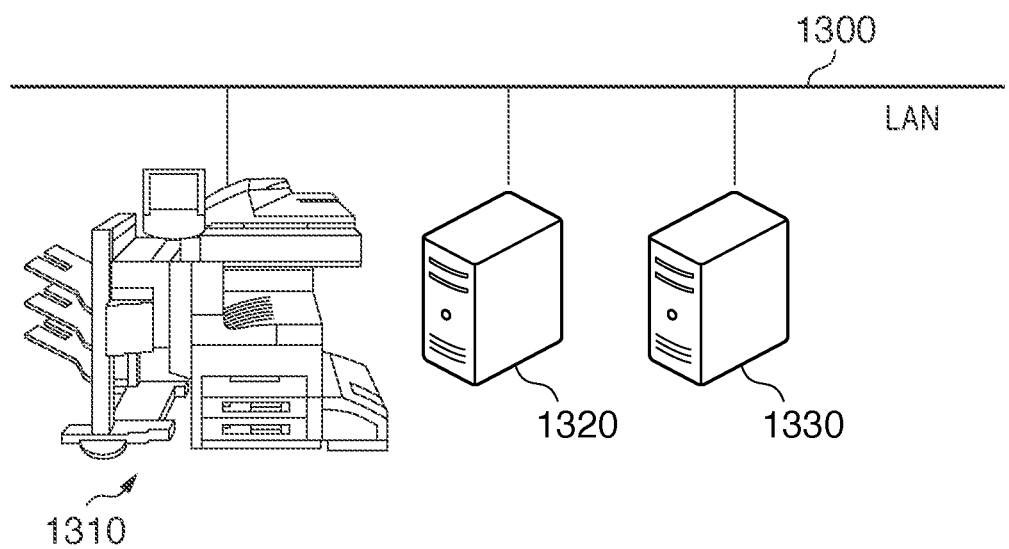

FIGS. 1A and 1B are diagrams showing examples of the overall arrangements of systems to which the present invention is applicable, and FIG. 1A shows the first embodiment. As shown in FIG. 1A, an MFP 110 and Web server 120 are connected to a LAN 100 such as Ethernet™.

The MFP 110 has a copy function. In addition, the MFP 110 has a data sending function of scanning a document image, and sending the scanned image data (to be also referred to as document data hereinafter) to a designated apparatus on the LAN 100 using an FTP protocol or SMB protocol. Furthermore, the MFP 110 can create an E-mail message to include an image as an attached file, and can send the E-mail message using an E-mail server (not shown).

The server 120 is a Web server. A Web application on the Web server sends an HTML page to be displayed on the MFP 110 in response to a request from the MFP 110. In the system of this embodiment, the number of devices is not particularly limited. Also, this embodiment adopts the LAN as a connection method. However, the present invention is not limited to such specific connection method. For example, an arbitrary network such as a WAN (public network), a serial transfer method such as USB, or a parallel transfer method such as Centronics or SCSI is applicable.

<Hardware Arrangement of MFP>

Figure 2A:
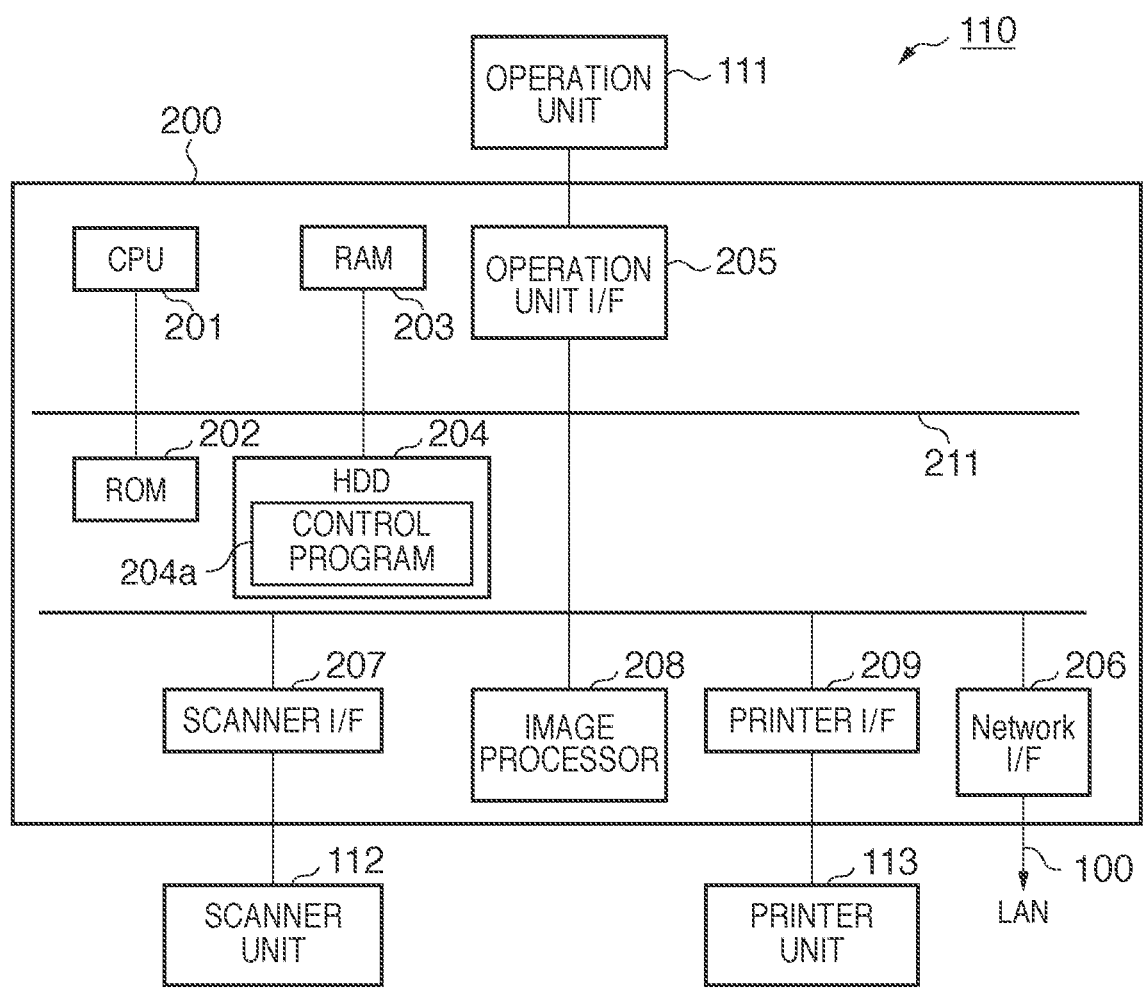
FIGS. 2A and 2B are block diagrams showing the hardware and software arrangement of an MFP according to the embodiment.

As shown in FIG. 2A, the MFP 110 is configured by the following components. That is, the MFP 110 is configured by a scanner unit 112 as an image input MFP, a printer unit 113 as an image output MFP, a controller 200 which controls the MFP 110, and an operation unit 111.

The scanner unit 112 converts information of an image into an electrical signal by inputting reflected light obtained by exposure-scanning an image on a document into a CCD. Furthermore, the scanner unit 112 converts the electrical signal into luminance signals including R, G, and B colors, and outputs the luminance signals to the controller 200 as digital image data. Note that document sheets are set on a document feeder, and when the user inputs a scan start instruction from the operation unit 111, the controller 200 supplies a document scan instruction to the scanner unit 112. Upon reception of this instruction, the scanner unit 112 feeds document sheets from the document feeder one by one, and performs scan operations of the document sheets. Note that the document scanning method is not limited to an automatic feeding method using the document feeder, but it may be a method of scanning a document placed on a glass surface (not shown) by moving an exposure unit.

The printer unit 113 is an image forming MFP which forms image data received from the controller 200 on a paper sheet as an image. Note that an image forming method of this embodiment adopts an electrophotographic method using a photosensitive drum or photosensitive belt. However, the present invention is not limited to such specific method. For example, the present invention can adopt an ink-jet method which prints an image on a paper sheet by ejecting inks from small nozzle arrays.

The controller 200 is electrically connected to the operation unit 111, scanner unit 112, and printer unit 113, and also to the LAN 100 via a network interface (I/F) 206. That is, the controller 200 is connected to other devices via the LAN 100. Then, communications based on an HTTP protocol are allowed.

A CPU 201 systematically controls accesses to various connected MFPs and those from other MFPs based on, for example, control programs stored in a ROM 202. In addition, the CPU 201 systematically controls various processes executed inside the controller 200. This control includes execution of programs required to implement the processes according to the flowcharts to be described later.

The ROM 202 stores, for example, a boot program of the apparatus and permanent data. A RAM 203 is a system work memory required for the operation of the CPU 201, and is also used as a memory for temporarily storing image data. The RAM 203 includes an area in which stored contents are held even after power-OFF of the apparatus main body by, for example, a battery backup, and an area in which stored contents are cleared after power-OFF. An HDD 204 is a hard disk drive, and can store system software and image data.

An operation unit I/F 205 is an interface unit required to connect a system bus 211 to the operation unit 111. The operation unit I/F 205 receives image data to be displayed on the operation unit 111 from the system bus 211, and outputs the image data to the operation unit 111. Also, the operation unit I/F 205 outputs information input from the operation unit 111 to the system bus 211. The network I/F 206 is connected to the LAN 100 and system bus 211, and inputs and output information. A scanner I/F 207 corrects, modifies, and edits image data received from the scanner unit 112. Note that the scanner I/F 207 has a function of determining whether the received image data is that of a color or monochrome document, and a text or photo document.

An image processor 208 performs direction conversion, image compression and decompression, and the like of image data. The image processor 208 can merges images stored in the HDD 204 to form a single image. A printer I/F 209 receives image data sent from the image processor 208, and applies image forming processing to the image with reference to attribute data appended to this image data. The image data after the image forming processing is output to the printer unit 113.

In this embodiment, the MFP is a network MFP which executes UI display processing. Alternatively, the present invention may be applied to other image processing apparatuses such as a general-purpose computer to which a general-purpose scanner and printer are connected.

<Hardware Arrangement of Web Server>

FIG. 3A is a block diagram showing the hardware arrangement of the Web server 120 shown in FIG. 1A. Referring to FIG. 3A, a CPU 301, RAM 302, ROM 303, network I/F 305, and hard disk drive (HDD) 306 are connected via a system bus 309 to be able to communicate with each other. Also, a display device 307 such as a CRT, an input device 304 such as a keyboard, and a pointing device 308 such as a mouse are connected via the system bus 309 to be able to communicate with each other.

The ROM 303 or HDD 306 stores control programs such as an operating system and Web application. The CPU 301 implements the functions as a computer by reading out the control programs from the ROM 303 or HDD 306 onto the RAM 302 and executing these programs as needed. The CPU 301 displays various kinds of information via the display device 307, and accepts user instructions from the input device 304 and pointing device 308. Furthermore, the CPU 301 communicates with other apparatuses on the LAN 100 via the network I/F 305.

<Software Arrangement of MFP>

Figure 2B:
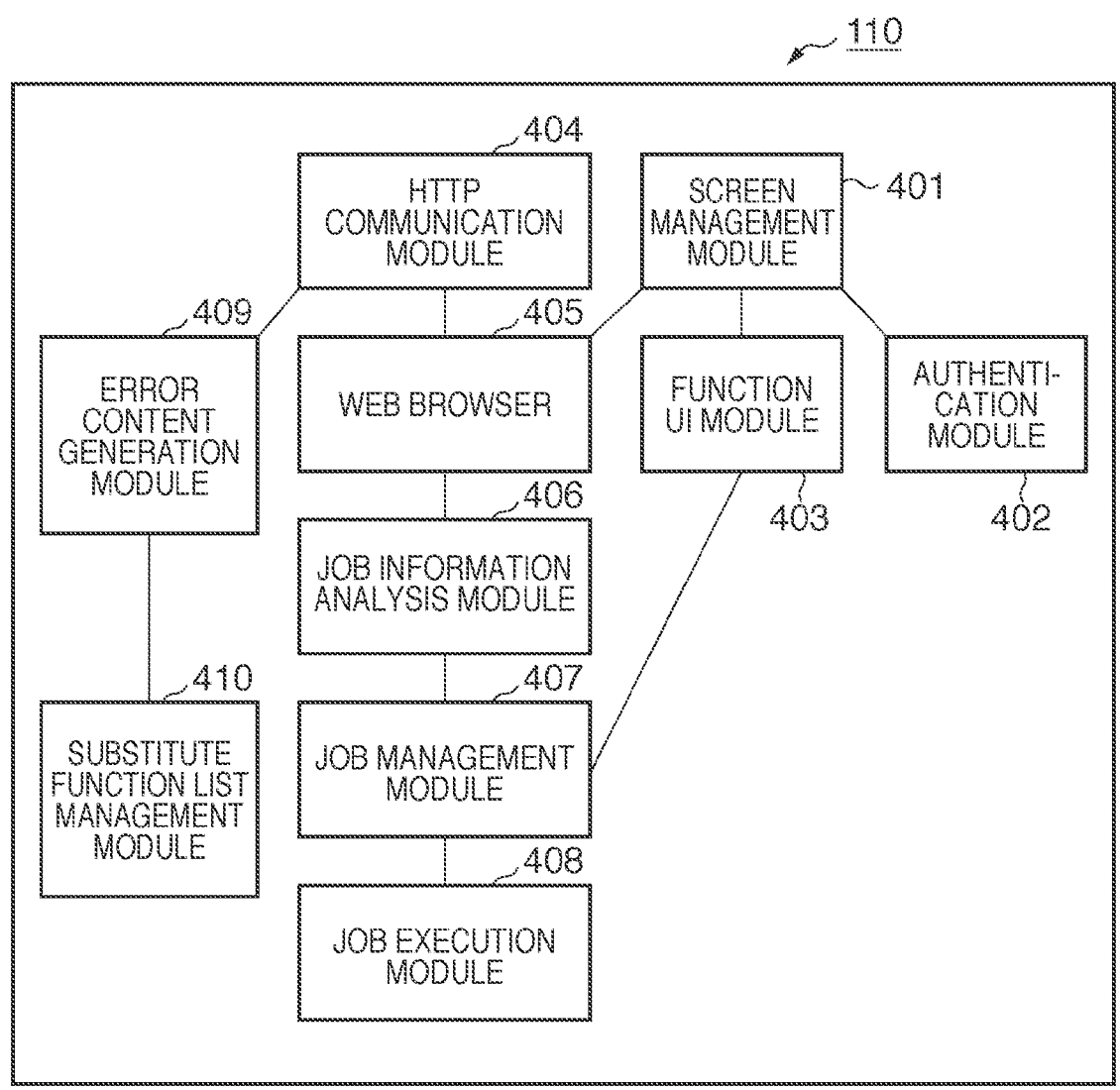

FIG. 2B is a block diagram showing the software module arrangement of the MFP 110 associated with UI display processing of the MFP according to this embodiment. These software modules are stored as control programs 204a in, for example, the HDD 204 of the MFP 110 in practice, are loaded onto the RAM 203, and are executed by the CPU 201.

A screen management module 401 executes display control for switching displays of modules having UI screens such as an authentication module 402, function UI module 403, and Web browser 405. The screen management module 401 displays a UI of each module on the operation unit 111 via the operation unit I/F 205 in accordance with an instruction from another software module. The authentication module 402 is a module which authenticates the user who operates the device. In this embodiment, the authentication module 402 authenticates the user by receiving authentication information from the operation unit 111 via the operation unit I/F 205. In this example, pieces of user information are held in the RAM 203 or HDD 204, and users are categorized into "administrator" and "general user".

The function UI module 403 is a software module which displays UIs that allows the user to use the internal functions of the MFP 110 such as a menu UI that prompts the user to select a function, a copy function UI, a data sending function UI, and a setting UI that allows the user to set the MFP 110. The function UI module 403 notifies a job management module 407 of an execution instruction of each function received from the user, and instructs that module to execute a job of that function. This software module is used when the MFP 110 alone provides functions without any UI display using the Web application and Web browser. In order to distinguish from UIs provided by the Web server, the menu UI, copy function UI, and sending function UI, which are displayed by the function UI module 403, will be respectively expressed as "embedded menu UI", "embedded copy UI", and "embedded sending UI" hereinafter. Also, the setting UI displayed by the function UI module 403 will be expressed as "embedded setting UI".

An HTTP communication module 404 is a software module which makes a communication based on an HTTP protocol by operating the network I/F 206. The Web browser 405 is a browser which communicates with the Web server 120 via the HTTP communication module 404. The Web browser 405 issues an acquisition request of an operation screen described in HTML to the Web server 120. Also, the Web browser 405 renders HTML data of the operation screen received from the Web server 120 via the HTTP communication module 404, and displays that screen on the operation unit 111. Furthermore, the Web browser 405 notifies the Web server 120 of inputs to the operation screen displayed on the operation unit 111.

Furthermore, the Web browser 405 of this embodiment passes job definition information required to execute device functions received from the Web server 120 to a job information analysis module 406, thus allowing execution of jobs. The Web browser 405 has a function of interpreting a script described in HTML data to issue an instruction to the screen management module 401 to display a UI of a designated module on the operation unit 111.

The job information analysis module 406 analyzes the job definition information received from the Web browser 405, notifies the job management module 407 of the analysis result, and executes each job. The job management module 407 manages job information by receiving instructions from the function UI module 403 and job information analysis module 406, and issues a sequential execution instruction to a job execution module 408. The job execution module 408 is a module which executes processing based on a job setting. For example, when a job is a copy job, the job execution module 408 executes the following job. That is, the job execution module 408 operates the scanner unit 112 to scan paper documents, and temporarily stores image data in the HDD 204. Then, the job execution module 408 operates the printer unit 113 to print the temporarily stored image data in the HDD 204.

An error content generation module 409 is a software module which generates content to be displayed on the Web browser 405 when an HTTP communication error has occurred. The error content generation module 409 generates content to be displayed on the Web browser 405 based on information of a substitute function list management module 410 when an HTTP communication error has occurred. This processing sequence will be described later.

The substitute function list management module 410 is a module which manages a substitute function list to be described later. The substitute function list may be set in the substitute function list management module 410 via the operation unit 111 of the MFP 110 or from an external device via the network I/F 206.

<Software Arrangement of Web Server>

FIG. 3B is a block diagram showing the software module arrangement of the Web server 120 according to this embodiment. The Web server 120 includes a Web application 501 and HTTP communication module 504. The Web application 501 includes a presentation module 502 and logic module 503. These pieces of software are stored in, for example, the HDD 306 of the Web server 120, are loaded onto the RAM 302, and are then executed by the CPU 301.

The presentation module 502 sends, via the HTTP communication module 504, data of the operation screen to be displayed on the Web browser 405 of the MFP 110 to the MFP 110 in response to a request from the MFP 110. Also, the presentation module 502 receives input information from the user, which is input via the operation screen displayed on the Web browser 405 of the MFP 110, from the MFP 110 via the HTTP communication module 504.

The logic module 503 executes processing for the input information from the MFP 110, which is passed from the presentation module 502. For example, the logic module 503 changes a screen to be displayed, and creates job definition information required to execute device functions of the MFP in accordance with inputs from the user. The HTTP communication module 504 is a software module which operates the network I/F 305 to perform communication using the HTTP protocol.

<Structure of Substitute Function List>

FIG. 4 is a table of the substitute function list managed by the substitute function list management module 410 of the MFP 110. Assume that the substitute function list is stored in the HDD 204 of the MFP 110 in this embodiment.

Referring to FIG. 4, a column 601 indicates UIs of the MFP 110, which are available in a substitute mode. In the example shown in FIG. 4, the embedded menu UI, embedded copy UI, embedded sending UI, and embedded setting UI of the MFP 110 are respectively expressed as "Menu", "Copy", "Send", and "Settings". Of course, other functions of the MFP may be defined. A column 602 indicates URL patterns of Web sites requested by the Web browser as substitute permission conditions. The example shown in FIG. 4 indicates that the functions of the column 601 are available only when an exception or error has occurred in a request to a URL that matches each URL pattern by a prefix search. A column 603 indicates whether or not authentication is required when a substitute operation is permitted. Authentication="required" indicates that user authentication is required to display a UI of that function. Authentication="not required" indicates that user authentication is not required. A column 604 indicates a user permission required to perform a substitute operation. In the example shown in FIG. 4, when permission="administrator", a UI display of a substitute function is permitted only when the authenticated user is an administrator user.

<UI Display Sequence>

The UI display processing sequence of the MFP 110 will be described below. When the MFP 110 is started up after power-ON, the CPU 201 loads the programs on the ROM 202 or HDD 204 onto the RAM 203, and executes the loaded programs. Note that the following processing sequence of the MFP 110 is implemented when the CPU 201 executes the programs of the respective software modules.

When the CPU 201 executes the screen management module 401, the screen management module 401 displays a UI. When the setting of the MFP 110 which is managed by the screen management module 401 is that to use the embedded UIs of the MFP 110, a display of the function UI module 403 is used as an initial display. On the other hand, when that setting is that to use UIs of an external Web server, a display of the Web browser 405 is used as an initial display. This embodiment will explain the processing under the assumption that the setting is that to use the UIs of the external Web server. Assume that the Web browser 405 sets a URL of a menu of the Web application 501 on the Web server 120 as an initial display Web site.

In this way, when the CPU 201 executes the Web browser 405, the Web browser 405 issues an HTML page acquisition request to the HTTP communication module 404 by designating the URL of the initial display Web site according to the above setting. In response to this request, the HTTP communication module 404 sends an HTTP acquisition request to the Web server 120. At this time, when the Web server 120 is normally running, the Web application 501 returns HTML data of a requested menu (to be referred to as a Web menu hereinafter) held by the Web application as a response message. On the other hand, when the Web server 120 is inactive, the request from the Web browser 405 reaches a time-out since there is no responding Web server. Also, even when the Web server 120 is running, if the Web application is busy or if there is no HTML data corresponding to the requested URL, the HTTP communication module 504 returns HTML data of an error page as a response message.

Figure 7:
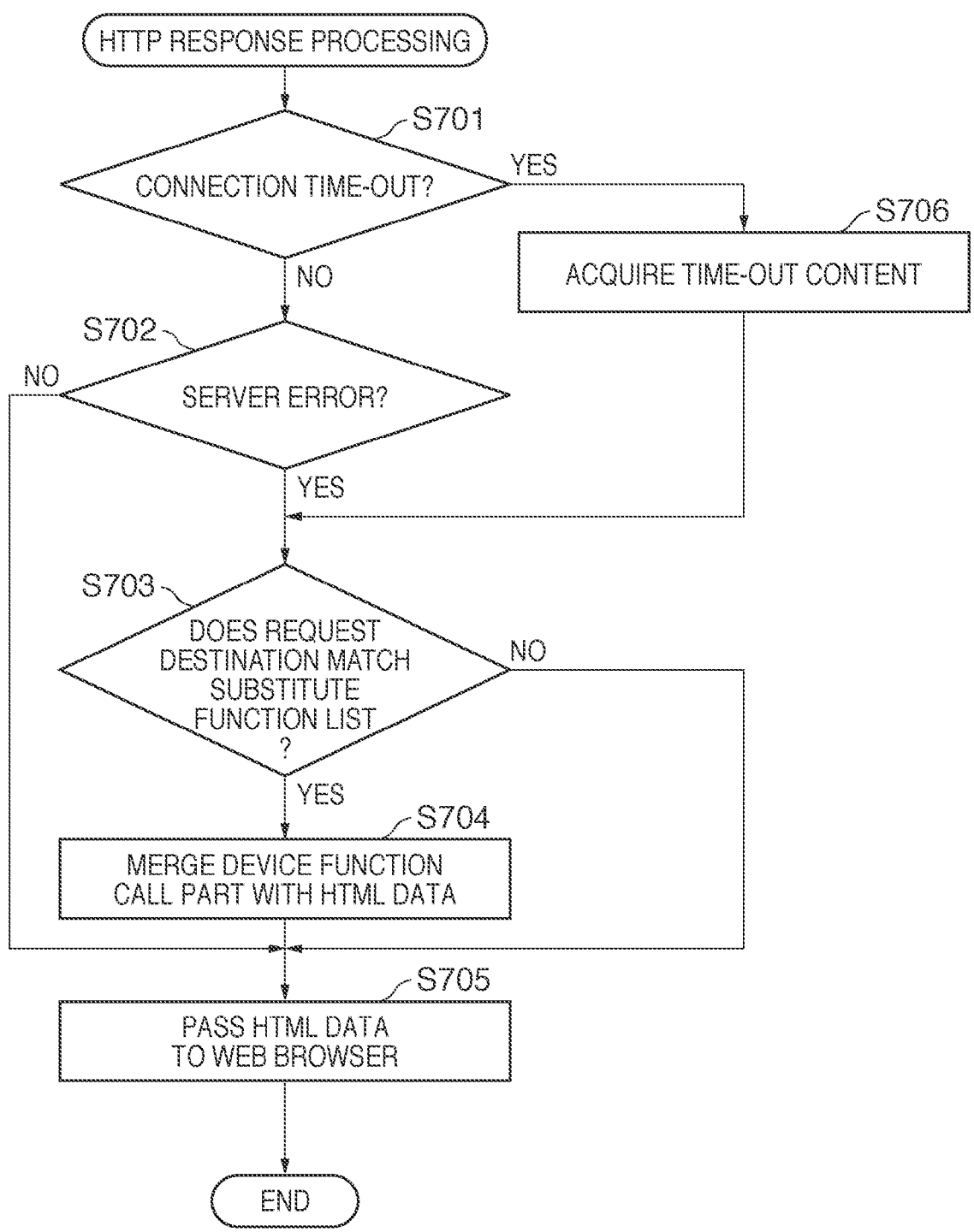
FIG. 7 is a flowchart of HTTP response processing according to the embodiment.

Substitute processing of the MFP based on a response from the Web server will be described below. FIG. 7 is a flowchart of the processing sequence of an HTTP response from the Web server 120 by the MFP 110. The HTTP communication module 404 checks in step S701 whether or not an acquisition request reaches a time-out. If no response is returned from the Web server 120 to which the request was sent within a predetermined time period, a time-out is determined, and the process advances to step S706. If a response is acquired from the Web server 120, the process advances to step S702.

The HTTP communication module 404 checks in step S702 whether or not the response from the Web server 120 is a normal response. If the received HTTP response is a normal response, the process jumps to step S705. On the other hand, if the received HTTP response is an error response, the process advances to step S703. The HTTP communication module 404 checks in step S703 whether or not the URL included in the acquisition request matches the substitute function list. If the URL matches the substitute function list, the HTTP communication module 404 passes HTML data included in the HTTP response to the error content generation module 409, and the process advances to step S704. Otherwise, the process jumps to step S705.

In step S704, the error content generation module 409 generates error content based on information managed by the substitute function list management module 410. Initially, the error content generation module 409 acquires an available function, requirement/non-requirement of authentication, and permission corresponding to the Web site matched in step S703. If authentication is not required, the error content generation module 409 creates a script required for the Web browser 405 to execute the available function, and content of an HTML button required to execute that script, and merges them with the HTML data received from the HTTP communication module 404. On the other hand, if authentication is required, the error content generation module 409 generates a script required for the Web browser 405 to execute authentication in response to pressing of an HTML button, and merges it with the HTML data. Furthermore, if administrator permission is required, the error content generation module 409 generates a script which displays a UI of the function only when the user is an administrator as a result of authentication, and merges it with the HTML data.

In step S705, the HTTP communication module 404 passes the HTML data to the Web browser 405 to update a display. Step S706 is executed when a time-out is determined in step S701. The HTTP communication module 404 acquires HTML data which is held by the error content generation module 409 and is to be displayed at the time of a time-out. The process then advances to step S703 to check whether or not to display a substitute UI.

As described above, when a communication is normally made with the Web server 120, the response from the Web server is passed to the Web browser 405 intact without being processed.

Figure 6A:
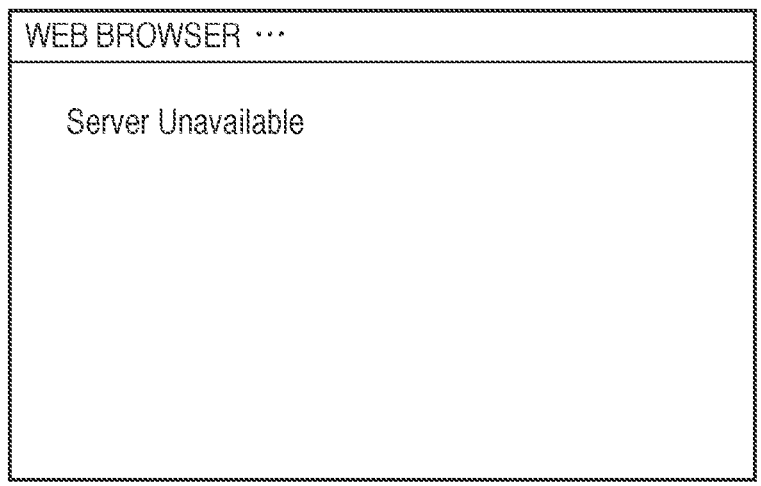
FIG. 6A is a view showing a display example of a Web browser in case of a server busy state.

A case will be described below wherein a communication with the Web server 120 is not normally made. FIG. 5A shows an example of a response from the Web server 120. FIG. 5A shows HTML data in case of a server busy state. When a request destination upon issuing this request is not included in the substitute function list shown in FIG. 4, the HTTP communication module 404 skips merging of content. As a result, the Web browser 405 displays a screen, as shown in FIG. 6A.

On the other hand, when the response shown in FIG. 5A is received, and when the request destination upon issuing the request is "www.xxx.com/webapp1/menu/index.html", which is included in the substitute function list shown in FIG. 4, the following processing is executed. With the process in step S704, an HTML button 1001 and script 1002 are merged, as shown in FIG. 5B. Then, the Web browser 405 displays a screen shown in FIG. 6B. Note that the script 1002 is a uniquely expanded Java™ Script, a UI name of an MFP function to be called is designated in a first argument, and a permission to be called is designated in a second argument. In the example of FIG. 5B, the first argument "Menu" represents "embedded menu", and the second argument "Everyone" represents "all users whose user authentication is not required". Note that the script 1002 need not be a Java™ Script, and the format of the script is not particularly limited as long as the Web browser can interpret.

Figure 6B:
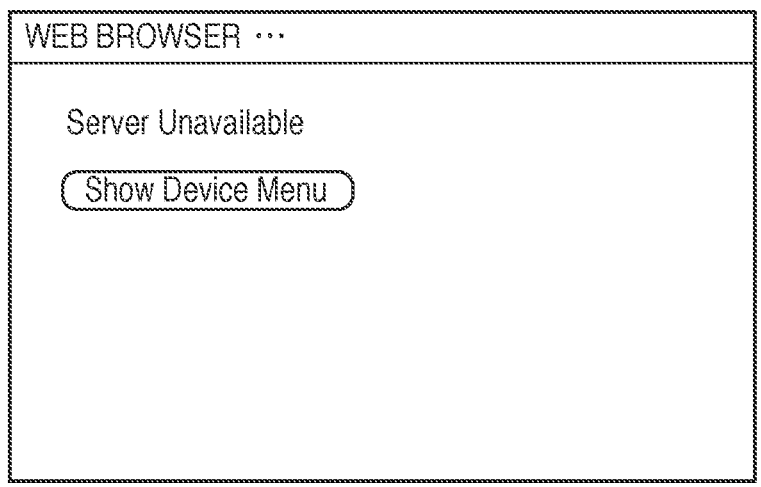
FIG. 6B is a view showing a display example of the Web browser when the GUI button is merged.
Figure 8:
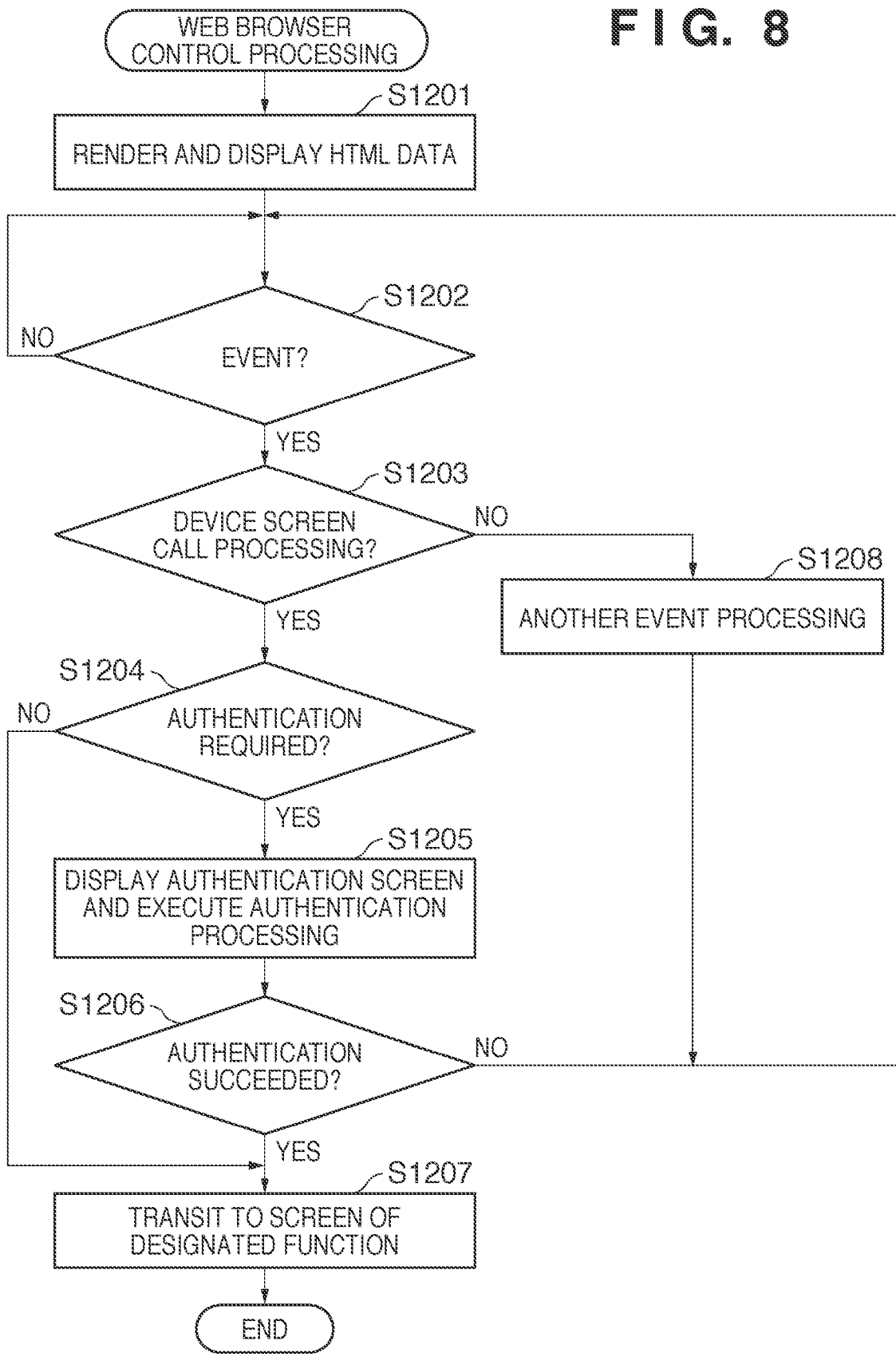
FIG. 8 is a flowchart of Web browser control processing according to the embodiment.

The processing executed when pressing of the button by the user is accepted by the Web browser 405 in this case will be described below. FIG. 8 is a flowchart showing the control processing of the Web browser 405. In step S1201, the Web browser 405 renders and displays HTML data received from the HTTP communication module 404. With this process, the screen shown in FIG. 6A or 6B is displayed. The Web browser 405 checks in step S1202 whether or not an event has occurred by a user operation or due to an elapse of time. The event by the user operation indicates, for example, pressing of the GUI button displayed on the Web browser. If the event has occurred, the process advances to step S1203; otherwise, the Web browser 405 waits for an event again.

The Web browser 405 discriminates in step S1203 if a process corresponding to the event is a transition instruction to a UI of an MFP function. In the example of FIG. 5B, as the process corresponding to the button event, "showFunction ('Menu', 'Everyone')" of the Java™ Script is called. Since this Java™ Script is configured to display "embedded menu", the Web browser 405 determines that the process is that to call the UI of the MFP function. If it is determined that the process is the transition instruction to the UI of the MFP function, the process advances to step S1204. Otherwise, the process advances to step S1208 to execute a process corresponding to the event as in a general Web browser.

The Web browser 405 checks in step S1204 whether or not authentication is required upon transition to the UI of the MFP function. In this example, the second argument of the Javascript function is checked to determine whether or not authentication is required. In the example of FIG. 5B, since the second argument is "Everyone" indicating all users, the Web browser 405 determines that authentication is not required. If authentication is required, the process advances to step S1205; otherwise, the process jumps to step S1207. In step S1205, the Web browser 405 controls the screen management module 401 to issue an authentication instruction to the authentication module 402. The authentication module 402 displays a screen (not shown) that prompts the user to input authentication information regarding the operation unit 111. In this example, a user name and password are accepted as the authentication information from the user. The authentication module 402 compares the accepted authentication information with information, which is held in advance in itself, to authenticate the user. After that, the authentication module 402 notifies the Web browser 405 of the user authentication result. Note that authentication may be attained by other methods such as an IC card or biometric authentication.

In step S1206, the Web browser 405 checks the authentication result. If the authentication has succeeded and it is determined that the user has a permission to call the UI of the MFP function, the process advances to step S1207; otherwise, the Web browser 405 controls the screen management module 401 to change a UI display again, and the process returns to step S1202. In step S1207, the Web browser 405 controls the screen management module 401 to change the screen to the UI of the designated MFP function.

As described above, the control processing sequence shown in FIG. 8 can control transition to the UI of the MFP function in only a specific situation.

The UI display processing sequence has been described. With this processing, only when a connection is established to a specific URL, and an error has occurred, a substitute operation is allowed.

This embodiment has explained the case of the initial display of the Web browser at the startup timing. However, this processing may always be executed. For example, the substitute operation can be implemented by the same processing even when a connection with the Web server 120 is disconnected after the MFP 110 is started up. As an example, the following situation will be assumed. That is, the URL of a menu in the Web server 120 (to be referred to as a Web menu hereinafter) is "www.xxx.com/webapp1/menu/index.html". Then, assume that the URL of a copy UI on the Web server 120 (to be referred to as a Web copy UI hereinafter), which can be called by redirection from that Web page is "www.xxx.com/webapp1/copy/index.html". Assume that when the user wants to call the Web copy UI from the Web menu on the Web browser 405 at this time, a connection with the Web server 120 is disabled. In this case, since an acquisition request from the Web browser 405 to the URL of the Web copy UI results in an error, the HTML button required to display "embedded copy UI" is merged in step S703.

By appropriately setting the substitute function list, as described above, a substitute operation according to a situation of occurrence of an error can be defined.

Note that the aforementioned embodiment uses Javascript to call the UI in the MFP from the Web browser. However, a method of calling the UI in the MFP from the Web browser may use another means. In the aforementioned embodiment, as means for calling the UI in the MFP from the Web browser, the HTML button is used, but other methods may be used. For example, another UI control may be used, or HTML data may be created to cause a screen transition after a predetermined time period elapses. Alternatively, HTML data may be created to display the UI of the function in the MFP at the time when the HTML data is loaded. Also, an item of an instruction of HTML data to be merged may be added to the table shown in FIG. 4 to allow the user to designate the display position, color, size, and the like on the Web browser.

In the aforementioned embodiment, the UI of the MFP function is called intact. Alternatively, a limitation of a function to be executed may be added to the table shown in FIG. 4. For example, a function limitation column may be set in the table shown in FIG. 4 to configure a script so that only a monochrome copy is executed upon using "embedded copy UI", and the Web browser 405 calls the function UI module 403.

Second Embodiment

The second embodiment will be described below. In the second embodiment, a Web server executes substitute UI control in place of the substitute UI display control by an MFP unlike in the first embodiment.

<System Arrangement>

FIG. 1B is a block diagram showing the overall arrangement of an information processing system according to this embodiment. In FIG. 1B, an MFP 1310 and Web servers 1320 and 1330 are connected to a LAN 1300. The hardware and software arrangements of the MFP 1310 are the same as those of the MFP 110 shown in FIG. 1A. Also, the hardware arrangement of the Web servers 1320 and 1330 is the same as that of the Web server 120 shown in FIG. 1A.

<Software Arrangement of Web Server>

FIG. 3C is a block diagram showing the software module arrangement of the Web server 1320 according to this embodiment. The Web server 1320 includes a Web application 1401, HTTP communication module 1404, error content generation module 1405, and URL list management module 1406. The Web application 1401 includes a presentation module 1402 and logic module 1403. These pieces of software are stored in, for example, an HDD (not shown) of the Web server 1320, and are executed by a CPU.

The presentation module 1402 is the same as the presentation module 502 shown in FIG. 3B. The logic module 1403 is the same as the logic module 503 shown in FIG. 3B. The HTTP communication module 1404 is the same as the HTTP communication module 504 shown in FIG. 3B. The error content generation module 1405 is the same as the error content generation module 409 of the first embodiment. The URL list management module 1406 is the same as the substitute function list management module 410 of the first embodiment, and holds a substitute function list which is the same as that shown in FIG. 4. In this embodiment, assume that the Web server 1320 provides a Web menu service, and the Web server 1330 provides a Web copy UI.

Figure 6C:
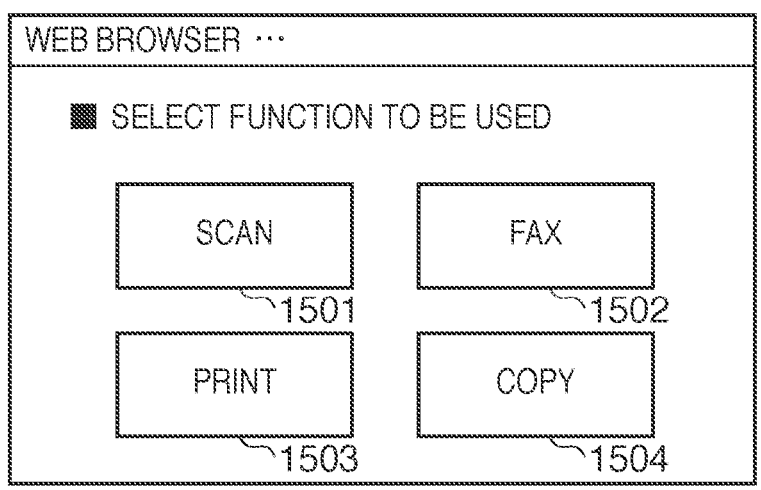
FIG. 6C is a view showing a menu display example on the Web browser.

FIG. 6C shows an example of a UI when the MFP 1310 acquires the Web menu of the Web server 1320 and displays it using a Web browser. GUI buttons 1501, 1502, 1503, and 1504 are links to Web applications of respective functions. Assume that a copy Web application on the Web server 1330 is to be called in this embodiment. This embodiment is different from the first embodiment in the following point. When the user presses the copy button 1504 on the Web browser of the MFP 1310, a request sent from the Web browser is transferred to the Web server 1330. Then, the Web server 1330 sends HTML data of a Web copy UI. At this time, the Web browser acquires the content of the Web server 1330 as a result of the request sent to the URL of the Web server 1320.

<UI Display Sequence>

The processing sequence of the Web server 1320 executed when the Web server 1320 issues a content request to the Web server 1330 will be described below. Note that the following processing sequence of the Web server 1320 is implemented when a CPU 301 executes programs of respective software modules.

The logic module 1403 of the Web application 1401 receives a notification indicating that the copy button is pressed on the screen shown in FIG. 6C from the Web browser of the MFP 1310. In response to this notification, the logic module 1403 issues a communication instruction to the HTTP communication module 1404 by designating the URL of the Web copy UI of the Web server 1330. The HTTP communication module 1404 sends an HTTP acquisition request to the Web server 1330. At this time, when the Web server 1330 is running normally, HTML data of the requested Web copy UI can be acquired as a response message. When the Web server 1330 is inactive, a time-out occurs. Even when the Web server 1330 is running, if it is busy or if there is no requested URL, the HTTP communication module 1404 receives HTML data of an error page as a response message.

HTML data processing in the Web server 1320 based on a response from the Web server 1330 will be described below. FIG. 9 shows the HTTP response processing sequence in the Web server 1320. The HTTP communication module 1404 checks in step S1601 if an acquisition request reaches a time-out. If a time-out is determined, the process advances to step S1606. If a response is acquired, the process advances to step S1602.

The HTTP communication module 1404 checks in step S1602 if the response is a normal response. If the received HTTP response is a normal response, the process jumps to step S1605. On the other hand, if the response is an error response, the process advances to step S1603. The HTTP communication module 1404 checks in step S1603 if the URL included in the acquisition request matches the substitute function list. If the URL matches the substitute function list, the HTTP communication module 1404 passes HTML data included in the HTTP response to the error content generation module 1405, and the process advances to step S1604. Otherwise, the process jumps to step S1605.

In step S1604, the error content generation module 1405 generates error content based on information managed by the URL list management module 1406. This process is the same as that in step S704 in the first embodiment. In step S1605, the HTTP communication module 1404 sends HTML data to the MFP 1310. Step S1606 is executed when a time-out is determined in step S1601. That is, the HTTP communication module 1404 acquires HTML data to be displayed when a time-out is reached, which is held by the error content generation module 1405. Then, the process advances to step S1603 to check whether or not to display a substitute UI.

As described above, when a communication with the Web server 1330 is normally made, the response from the Web server is passed to the MFP 1310 intact without being processed. On the other hand, when a communication with the Web server 1330 is not normally made, HTML data that allows to call the embedded function of the MFP 1310 is passed from the Web server 1320 to the MFP 1310 as in the first embodiment.

The UI display processing sequence has been described. This processing allows the Web server side to execute a substitute operation.

In the aforementioned embodiment, the MFP 1310 displays an embedded UI in the device based on the passed HTML data. Alternatively, the MFP 1310 may be configured to permit to display the embedded UI based only on HTML data passed from a specific server. In this case, a screen transition which is not intended by the administrator by content sent from an illicit server can be avoided.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-274932, filed Dec. 2, 2009, which is hereby incorporated by reference herein in its entirety.

The invention claimed is:

1. An image processing apparatus that has at least one function, the apparatus comprising:
    a memory configured to store a list in which a correspondence between each function and a URL is described; and
    a processor coupled to the memory and programmed to function as:
        a request unit configured to designate a predetermined URL to request a Web server to send operation screen data; and
        a display control unit configured to receive the operation screen data that is sent by the Web server in response to the request by the request unit, and to display, on an operation unit, an operation screen based on the received operation screen data,
    wherein, if the display control unit fails to receive the operation screen data and the predetermined URL is not included in the list, the display control unit displays a communication error message on the operation unit, and wherein, if the display control unit fails to receive the operation screen data and the predetermined URL is included in the list, the display control unit displays, on the operation unit, another operation screen that allows an instruction regarding a function corresponding to the predetermined URL.

2. The apparatus according to claim 1, wherein the operation screen is displayed by using a Web browser function.

3. The apparatus according to claim 1, wherein, if the operation screen data fails to be received and the predetermined URL is included in the list, the other operation screen that allows the instruction regarding the function corresponding to the predetermined URL is displayed, based on screen data in which an object for calling the function is merged into screen data for notifying of a communication error.

4. The apparatus according to claim 3, wherein the screen data for notifying of a communication error is transmitted by the Web server.

5. The apparatus according to claim 1, wherein the function includes a copy function or a transmission function.

6. The apparatus according to claim 5, wherein, if the display control unit fails to receive the operation screen data and the predetermined URL is included in the list, the display control unit displays the other operation screen that allows the instruction regarding the copy function so that the copy function is limited to a monochrome copy.

7. The apparatus according to claim 1,
wherein the processor is further programmed to function as a judging unit configured to judge whether the display control unit fails to receive the operation screen data, and
wherein, in a case where the judging unit judges that the display control unit fails to receive the operation screen data and the predetermined URL is included in the list, the display control unit displays, on the operation unit, the other operation screen that allows the instruction regarding the function corresponding to the predetermined URL.

8. A control method of an image processing apparatus that has at least one function, the control method comprising steps of:
storing a list in which a correspondence between each function and a URL is described;
designating a predetermined URL to request a Web server to send operation screen data;
receiving the operation screen data that is sent by the Web server in response to the request; and
displaying, on an operation unit, an operation screen based on the received operation screen data,
wherein, if the operation screen data fails to be received and the predetermined URL is not included in the list, a communication error message is displayed on the operation unit, and
wherein, if the operation screen data fails to be received and the predetermined URL is included in the list, another operation screen that allows an instruction regarding a function corresponding to the predetermined URL is displayed on the operation unit.

9. The control method according to claim 8, wherein the operation screen is displayed by using a Web browser function.

10. The control method according to claim 8, wherein, if the operation screen data fails to be received and the predetermined URL is included in the list, the other operation screen that allows the instruction regarding the function corresponding to the predetermined URL is displayed, based on screen data in which an object for calling the function is merged into screen data for notifying of a communication error.

11. The control method according to claim 10, wherein the screen data for notifying of a communication error is transmitted by the Web server.

12. The control method according to claim 8, wherein the function includes a copy function or a transmission function.

13. The control method according to claim 8,
wherein the function includes a copy function or a transmission function, and
wherein, if the operation screen data fails to be received and the predetermined URL is included in the list, the other operation screen that allows the instruction regarding the copy function is displayed so that the copy function is limited to a monochrome copy.

14. A non-transitory computer-readable medium storing a program that when executed causes a computer to perform a control method of an image processing apparatus that has at least one function, the control method comprising steps of:
storing a list in which a correspondence between each function and a URL is described;
designating a predetermined URL to request a Web server to send operation screen data;
receiving the operation screen data that is sent by the Web server in response to the request; and
displaying, on an operation unit, an operation screen based on the received operation screen data,
wherein, if the operation screen data fails to be received and the predetermined URL is not included in the list, a communication error message is displayed on the operation unit, and
wherein, if the operation screen data fails to be received and the predetermined URL is included in the list, another operation screen that allows an instruction regarding a function corresponding to the predetermined URL is displayed on the operation unit.

* * * * *